Sept. 25, 1923.                J. C. LOW                1,468,720
FISHING FLOAT
Filed Oct. 10, 1922
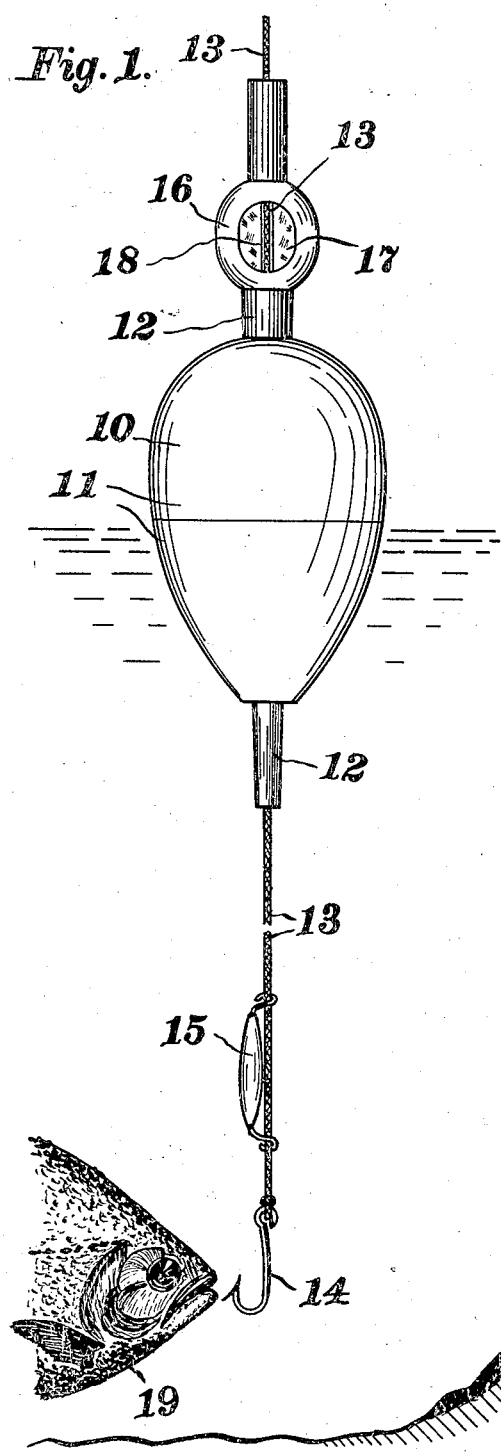
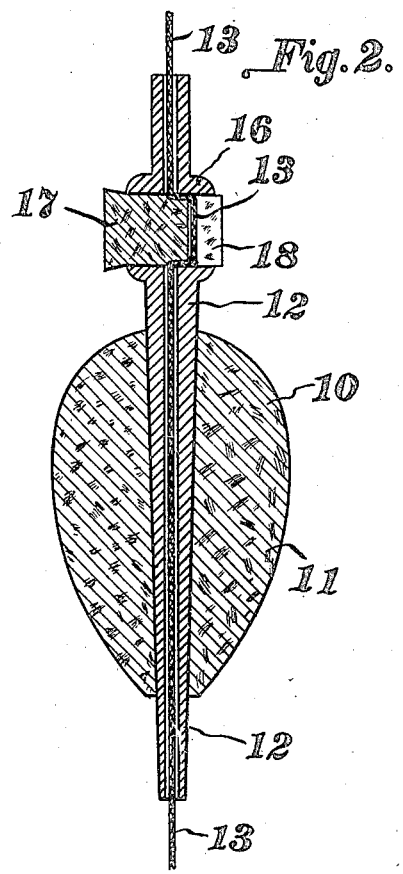
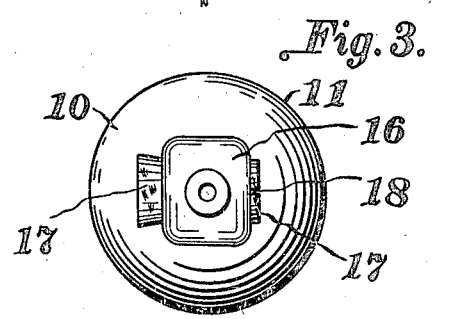
Inventor
J. C. Low.
By Arthur H. Sturges.
Attorney Patented Sept. 25, 1923.

1,468,720

UNITED STATES PATENT OFFICE.

JULIUS C. LOW, OF KANSAS CITY, MISSOURI.

FISHING FLOAT.

Application filed October 10, 1922. Serial No. 593,533.

*To all whom it may concern:*

Be it known that I, JULIUS C. LOW, a citizen of the United States, residing at Kansas City, in the county of Jackson and State of Missouri, have invented certain new and useful Improvements in Fishing Floats, of which the following is a specification.

The present invention relates to fishing tackle, and more particularly to those devices known as floats.

An object of the present invention is to provide a float which may be placed on a fishing line and moved along the same and secured at the desired distance from the hook end of the line to adapt the fishing line to waters of different depths, the construction of float being such that it presents no protruding parts liable to catch on obstacles in and around the water and so that it may be conveniently handled.

Another object of the invention is to provide a float of this character by means of which the bottom of the body of water may be readily sounded to gage the depth of the body of water in advance of securing the float on the line.

A further object of the invention is to provide a float which not only presents a smooth exterior surface of a general uniform contour to ward off obstacles encountered in the use of the float but which embodies a construction wherein is eliminated all metal subject to corrosion, rusting or rapid deterioration which at the present time are disadvantages found in the use of most of the floats of the present day construction.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevation of the fishing line suspended in the water upon a float constructed according to the present invention.

Figure 2 is a vertical section taken through the float and the adjacent portions of the fishing line, the section being taken at right angles to the showing in Figure 1.

Figure 3 is a top plan view of the float removed from the line, and

Figure 4 is a detailed top plan view of the locking key or wedge employed.

Referring more particularly to the drawing 10 designates the body of the float which may be of any approved configuration but which is preferably enlarged at its upper end and constructed of buoyant material such as cork which is covered by a coating 11 of paint or the like in one or more colors as is the present usual method for identifying the float from a distance and determining the movement thereof.

Wedged axially into and through the float 10 is a tapering tube 12 which projects at opposite ends from the float and which has its tapering end disposed downwardly. A fishing line 13 is adapted to be threaded through the tube 12 and the latter is designed to slide on the fishing line to the desired point and with respect to the hook 14 and the sinker 15 of the fishing line. Near the upper end of the tube 12 there is provided an enlargement or head 16 which, externally is preferably rounded so as to present no corners or projections. The head 16 has a transverse opening therethrough which intersects the opening of the tube 12 and which in cross section is substantially eliptical with the major axis coincident with the axis of the tube 12. Fitting in the head 16 is a key or plug 17 which may comprise a body of cork which, as shown in Figure 4, is slightly tapered from end to end for binding engagement in the opening of the head. As the fishing line 13 is threaded to the tube 12 it is adapted to extend through the opening in the head and is arranged for contact with the key 17. This key 17 has in its inner end a transverse slit or opening 18 of sufficient size to snugly receive the fishing line 13 therethrough, the slit 18 opening through the reduced end of the key so that the latter may be inserted in the head 16 and the fishing line will enter the slit 18.

A further advantage of the slit 18 is that when the fishing line 13 is drawn through the tube 12 the line may also slide through the slit 18 and the key wedge 17 will be held from accidental displacement from the head by frictional contact of the sides of the slit 18 with the fishing line.

In the use of the float on the fishing line which is frequently desirable to adjust the float so that the hook 14 will in use be spaced a desired distance from the bottom of the river or other body of water where the fishing operation is carried on. To effect this adjustment the line is drawn in the body of water and payed out until the sinker 15 strikes the bottom. The fishing line 13 is now pulled upwardly through the tube 12 of the float to a sufficient distance to draw the line taut for maintaining the float in substantially upright position. When this is determined the key or wedge 17 may be forced in the head 18 sufficiently to offset a portion of the fishing line 13 and thus binding it against the inner wall of the head and also through the slit 18 in the key. As the key is of resilient material it may be compressed sufficiently to bind evenly in the head and thus hold the key from becoming loose except where abnormal pressure is exerted upon the line or key to release the latter.

When the float and fishing line 13 are removed after the adjustment has been made, the depth of the body of water may then be ascertained for positioning the hook 14 at the desired distance below the float. This attachment is necessary while fishing for what are known as mud or body fish, such as the carp, indicated in Figure 1 at 19, and wherein it is necessary to adjust the line so that the hook will be spaced but slightly above the bottom as shown in Figure 1.

It is obvious that various changes and modifications may be made in the details of construction and design of the above specifically described embodiment of this invention without departing from the spirit thereof, such changes and modifications being restricted only by the scope of the following claims.

What is claimed is:

1. A float for fishing lines comprising a buoyant body, a tube arranged axially in the body for receiving a fishing line therethrough and having a transverse opening near its upper end, and a wedge-shaped key fitted in the opening having a kerf in its inner end for engagement with the fishing line and adapted to be forced into the opening for offsetting a portion of the fishing line and binding it in the tube.

2. A float for fishing lines comprising a buoyant body, a tubular member arranged axially in the body and provided on its upper end with an enlarged head having a transverse opening therein intersecting the opening of the tube, said tube being adapted to receive a fishing line therethrough, the line being adapted to pass through the opening of the head, and a wedge member detachably fitting in the head and having a kerf in its initial end for receiving said fishing line therethrough, said wedge member being adapted to be forced into said head for offsetting a portion of the fishing line and binding the latter in the head.

3. A float for fishing lines comprising a buoyont body adapted to receive a fishing line therethrough, a head carried on said body provided with an opening through which said line extends, and a key member mounted in the head for engagement with the fishing line and adapted to be wedged transversely in the head for binding engagement with the fishing line to hold the float thereto.

4. In a float for fishing lines, a buoyant body, a tube fitted axially in the body and adapted to receive a fishing line therethrough said tube provided with a head upon its upper end provided with a transverse opening therein intersecting the opening of the tube, and a key member removably fitting in the head and being slit at its initial end for receiving a portion of the fishing line therethrough, said fishing line being adapted to be drawn through the tube and the key member for adjusting the float on the fishing line and said key member being adapted to be forced in the head for offsetting the line in the head.

In testimony whereof, I have affixed my signature in presence of two witnesses.

JULIUS C. LOW.

Witnesses:
 ARTHUR H. STURGES,
 HIRAM A. STURGES.